Inventor:
Daniel Berkowitz,
by Harry M. Saragovitz,
Edward J. Kelly, Herbert Berl
& Charles J. Murphy
Attorneys

United States Patent Office 3,442,255
Patented May 6, 1969

3,442,255
RESTRAINER FOR LONG TAILED ANIMALS
Daniel Berkowitz, New York, N.Y.
(213 Lakeview Gardens, Natick, Mass. 01760)
Filed May 8, 1967, Ser. No. 637,883
Int. Cl. A61d 3/00, 7/02
U.S. Cl. 119—103
10 Claims

ABSTRACT OF THE DISCLOSURE

An apparatus for restraining long tailed animals comprising an open ended enclosure tapering to a constricted end into which the animal is drawn by passing its tail through a slot in the wall of the enclosure and restrained by clamping the tail. An opening near the constricted end of the enclosure provides access to the abdominal region of the restrained animal for intraperitoneal injection.

---

The Government has a non-exclusive, irrevocable, royalty-free license in the invention described herein, with power to grant sublicenses for all governmental purposes.

This invention relates to apparatus for restraining long tailed animals, such as mice, so that they may be more easily injected or inoculated, particularly intraperitoneally.

In the development of certain types of food preservation processes, particularly where the food is hermetically sealed in the absence of any substantial amount of oxygen, it is important to test samples of the food after various storage periods to determine whether strains of *Clostridium botulinum* have been destroyed. Such tests are usually conducted by injecting mice intraperitoneally with solutions or suspensions prepared from the foods. If the process fails to destroy the *Clostridium botulinum*, the mice die after periods of time which depend on the concentration of the toxin in the solution or suspension prepared from the food.

For the purpose of carrying out these tests, it has been customary to hold a mouse in one hand while injecting a liquid being tested for the presence of toxin intraperitoneally with a hypodermic needle held in the other hand. When this technique is employed, there is always a possibility of the needle slipping and nicking the hand holding the mouse. Although technicians usually are given immunizing shots for protection, these are not completely effective in all instances, particularly in case of massive doses of toxin. Hence, it is most desirable to take precautions to minimize the possibilities of self-injection by a technician.

An object of the present invention is to provide an apparatus for easily and efficiently restraining long tailed animals while they are being injected or inoculated or otherwise being treated or subjected to test procedures.

Another object is to provide an apparatus for immobilizing a long tailed animal so as to free both hands of a technician working with the animal for the manipulation of instruments used in treating or testing the animal.

Other objects and advantages will be apparent from the following description of one embodiment of the invention, and the novel features will be particularly pointed out hereinafter in connection with the appended claims.

Figure 1:
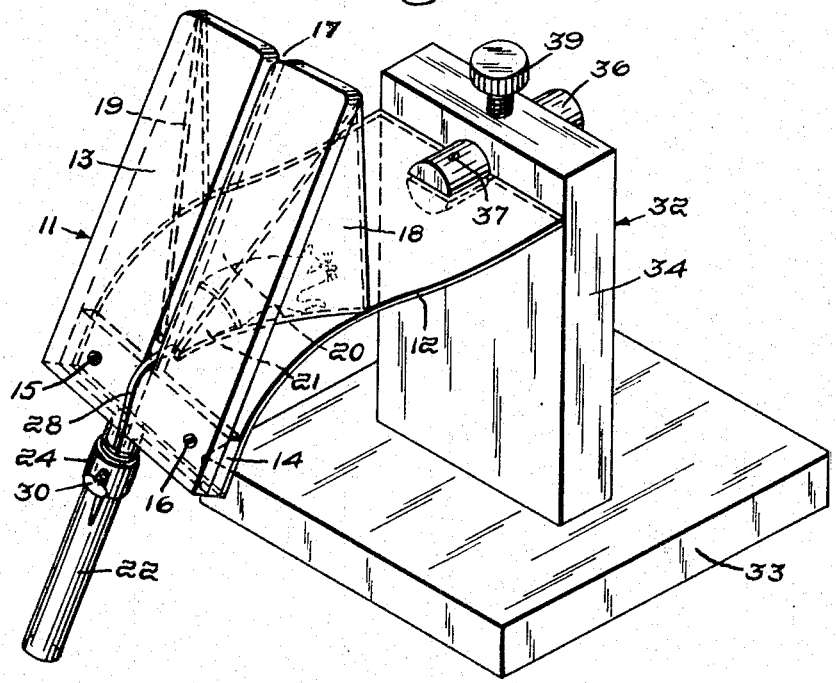
FIGURE 1 is a perspective view of my apparatus for restraining long tailed animals, including a mouse shown partly in phantom in the position in the apparatus in which it is normally placed preparatory to conducting tests thereon.
Figure 2:
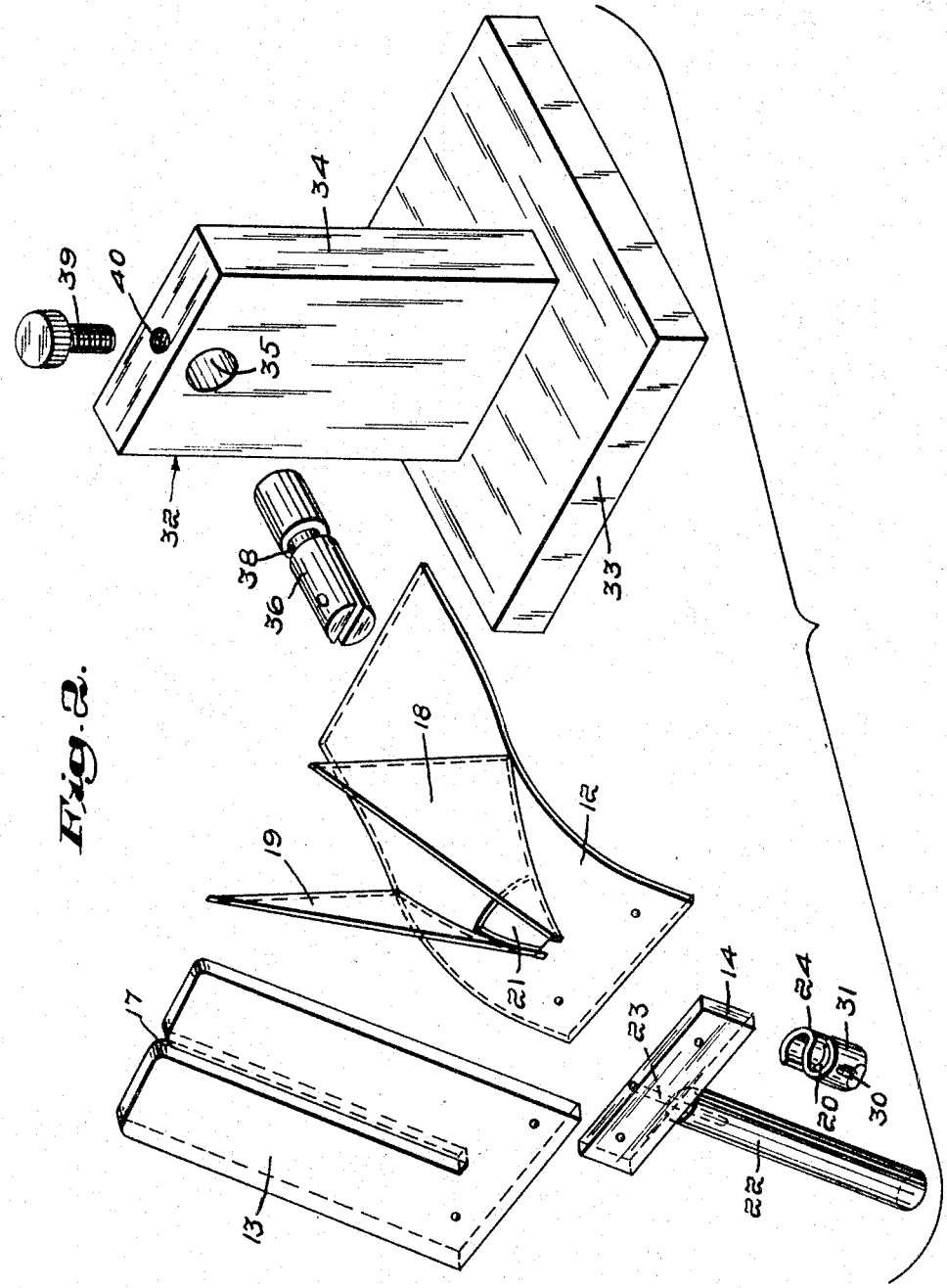
FIGURE 2 is a perspective exploded view of the apparatus of the invention.

In the illustrated embodiment of the invention, the long tailed animal restrainer, generally represented by reference numeral 11, comprises a base portion 12 which is a relatively thin plate or sheet formed so that its upper surface, as shown in FIGURES 1 and 2, is generally convex in longitudinal cross section and a generally rectangularly shaped flat top portion 13. One end of the base portion 12 and top portion 13 are joined together with spacer 14 therebetween by means of screws 15 and 16 so that an acute angle is formed between the inside surfaces thereof as best seen in FIGURE 1. An open ended slot 17 is provided in top portion 13 extending from the free end thereof to the point at which the top portion is joined to spacer 14 for a purpose to be described. Side portions 18 and 19 are mounted between base portion 12 and top portion 13 so as to converge at an acute angle toward the apex of the acute angle formed between the base portion 12 and the top portion 13 thereby forming an enclosure 20 having a relatively large open end and tapering to a constricted closed end adjacent to spacer 14.

An opening 21 is provided in base portion 12 near the constricted closed end of enclosure 20 providing access to the interior of the enclosure at this point. The purpose of opening 21 is to provide access to the abdominal area of a mouse or other long tailed animal which has been restrained in enclosure 20 in a manner to be described.

It is preferred to construct top portion 13, base portion 12, and side portions 18 and 19 of transparent material, for example "Lucite" or the like, so that the animal being tested or treated will be substantially completely visible at all times regardless of the orientation of the restrainer.

Figure 3:
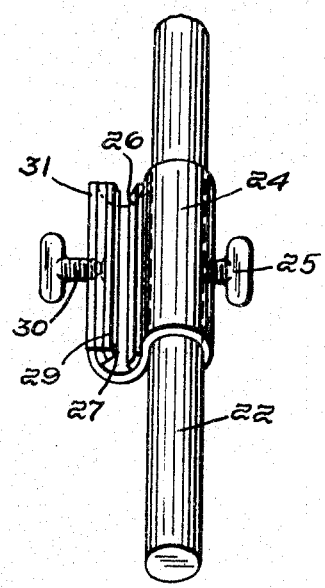
FIGURE 3 is a perspective view of the tail clamp and tail clamp support for restraining the tail of a long tailed animal while it is being restrained in the apparatus of the invention.

A tail support 22 is attached to spacer 14 by means of a screw 23 or other convenient means. The animal's tail may be readily clamped against the tail support by the user's hand or, preferably, a tail clamp 24 which is S-shaped in cross-section is adjustably attached to tail support 22 by means of a wing nut setscrew 25, shown in FIGURE 3. Tail clamp 24 has a fixed pad 26 and a movable pad 27 between which the tail 28 of a long tailed animal, such as a mouse, is clamped. Movable pad 27 is mounted on a movable metal plate 29 which is connected to wing nut setscrew 30 which passes through a threaded opening in the top portion 31 of tail clamp support 22 and is rotated therein to move the metal plate 29 and pad 27 down or up to clamp or unclamp the tail of the animal.

The animal restrainer may be held in one hand by grasping tail support 22 below tail clamp 24. However, it is preferred that it be mechanically supported so as to free both hands of the technician. For this purpose, a support 32 comprising a support base 33 and a support upright 34 attached thereto is provided. Support upright 34 has an opening 35 passing therethrough from front to rear sized to receive a rod-like member 36 for rotation therein. Rod-like member 36 is longitudinally slotted at one end so as to receive the end of base portion 12 which is held in the slot by setscrew 37 and provided with a circumferential slot 38 near the other end thereof. Member 36 is held in place within opening 35 by means of thumb setscrew 39 mounted in threaded opening 40 in support upright 34 with the inner end of setscrew 39 engaged in slot 38 of the rod-like member. Thus restrainer 11 may be held stationary in any desired position by tightening thumb setscrew 38 against member 36, rotated about the axis of member 36 by loosening setscrew 39 slightly, or completely removed from the support 32 by loosening setscrew 39 until it is withdrawn from slot 38 of member 36.

In use, the restrainer 11 of the invention is usually first oriented as shown in FIGURE 1. A mouse or other long tailed animal is placed within enclosure 20 so that its tail passes through slot 17. The animal is then drawn into the constricted end of enclosure 20 by tension applied to its tail and immobilized by maintaining tension on its tail either manually or by clamping the tail in clamp 24. The restrainer 11 may then be rotated to any desired orientation, loosening the setscrew 39 if necessary and subsequently tightening it if it is desired to lock the restrainer in position. Its abdomen is exposed through opening 21 so that intraperitoneal injections may be made easily, quickly and with complete safety to the technician making the injection. The animal's tail may be injected intravenously or blood may be withdrawn therefrom with the restrainer and the animal oriented in the most convenient manner for such tests.

It is to be understood that the restrainer of the invention is adapable for use with animals of different sizes as well as different species. For example, a size can be selected which will be usable with rats as well as mice or larger restrainers of the same general construction may be made for use with larger long tailed animals, such as opossums, cats, and the like. Further, it will be apparent that openings may be provided in other areas of the enclosure to provide access to other portions of the animal's body where the nature of the treatment makes this desirable or necessary.

It is apparent from the foregoing description that the present invention provides an apparatus which is very effective for restrainnig long tailed animals, such as mice, during injection or inoculation or other treatment so that they may be rapidly and efficiently handled during such treatment. The apparatus of the invention saves considerable amounts of time over manual restraint of such animals and therefore reduces the number of technicians required in large-scale testing programs involving mice or rats or other long tailed animals. The greatly enhanced safety of handling such animals and the hazardous chemicals used in conducting animal tests results in much greater peace of mind on the part of all persons connected with this type of work when the apparatus of the invention is used instead of holding the animals in hand during treatment.

It is understood that various changes in the details, materials, and arrangement of parts, which have been herein described and illustrated in order to explain the nature of the invention, may be made by those skilled in the art within the principle and scope of the invention.

I claim:
1. An apparatus to restrain a long tailed animal during treatment thereof comprising
   (a) a base portion,
   (b) a top portion forming an acute angle with said base portion,
   (c) opposed side portions extending between said base portion and said top portion,
   (d) said side portions converging at an acute angle toward the apex of the angle formed between said base portion and said top portion to form an enclosure having a relatively large open end and tapering to a constricted closed end,
   (e) said top portion having an open ended slot therethrough extending from the open end of said enclosure to the closed end thereof,
   whereby a long tailed animal may be restrained in predetermined position in said enclosure by placing its tail in said slot and drawing said animal into the constricted end of said enclosure by tension on its tail.

2. An apparatus to restrain a long tailed animal during treatment theerof as in claim 1 wherein an opening is provided in the base portion thereof in a position to provide access to a predetermined part of the body of an animal restrained therein.

3. An apparatus to restrain a long tailed animal during treatment thereof as in claim 2 wherein said opening in said base portion is located near the constricted end of said enclosure whereby access may be gained to the abdominal area of an animal restrained in said enclosure with its abdomen resting on said base portion.

4. An apparatus to restrain a long tailed animal during treatment thereof as in claim 1 having means for mounting said enclosure for rotation about the longitudinal center line of said base portion thereof.

5. An apparatus to restrain a long tailed animal during treatment thereof as in claim 1 having means for maintaining tension on the tail of an animal restrained therein.

6. An apparatus to restrain a long tailed animal during treatment thereof as in claim 1 having means extending from the apex of said enclosure for maintaining tension on the tail of an animal restrained therein.

7. An apparatus to restrain a long tailed animal during treatment thereof as in claim 1 wherein at least a portion of said enclosure is formed of transparent material.

8. An apparatus to restrain a long tailed animal during treatment thereof as in claim 1 wherein said base portion of said enclosure is formed of transparent material.

9. An apparatus to restrain a long tailed animal during treatment thereof as in claim 3 wherein the inside surface of said base portion is convex in longitudinal cross-section.

10. An apparatus to restrain a long tailed animal during treatment thereof as in claim 4 wherein said means for mounting said enclosure comprises a member extending from the open end of said enclosure along the approximate longitudinal center line along the base portion thereof and means for rotatably mounting the free end of said member in a support structure and including means for releasably locking said member against rotation.

References Cited

UNITED STATES PATENTS

| | | | |
|---|---|---|---|
| 2,498,051 | 2/1950 | Shipley | 119—99 |
| 2,540,650 | 2/1951 | Brosene et al. | 119—98 |
| 2,603,184 | 7/1952 | Cook | 119—96 |
| 2,987,042 | 6/1961 | Rothberg | 119—103 |
| 3,094,101 | 6/1963 | Porter | 119—103 |
| 3,103,204 | 9/1963 | Greene | 119—103 |
| 3,286,693 | 11/1966 | Clarke et al. | 119—103 |

ALDRICH F. MEDBERY, Primary Examiner.

U.S. Cl. X.R.

119—98